United States Patent
Poynot et al.

(10) Patent No.: US 12,455,074 B2
(45) Date of Patent: Oct. 28, 2025

(54) COMPACT FLAME-CURTAIN BURNER

(71) Applicant: L'Air Liquide, Société Anonyme pour l'Etude et l'Exploitation des Procédés Georges Claude, Paris (FR)

(72) Inventors: Philippe Poynot, Les Loges-en-Josas (FR); Sébastien Cadalen, Paris (FR); Vincent Gourlaouen, Montigny-le-bretonneux (FR); Romain Ravet, Les Loges-en-Josas (FR); Rémy Vandendriessche, Palaiseau (FR); Xavier Paubel, Montigny-le-bretonneux (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 647 days.

(21) Appl. No.: 17/442,929

(22) PCT Filed: Jan. 23, 2020

(86) PCT No.: PCT/EP2020/051648
§ 371 (c)(1),
(2) Date: Sep. 24, 2021

(87) PCT Pub. No.: WO2020/192983
PCT Pub. Date: Oct. 1, 2020

(65) Prior Publication Data
US 2022/0120438 A1    Apr. 21, 2022

(30) Foreign Application Priority Data
Mar. 26, 2019 (EP) .................................. 19305381

(51) Int. Cl.
*F23D 14/22* (2006.01)
*F23D 14/32* (2006.01)
*F23D 14/84* (2006.01)

(52) U.S. Cl.
CPC ............. *F23D 14/22* (2013.01); *F23D 14/32* (2013.01); *F23D 14/84* (2013.01); *F23D 2203/102* (2013.01)

(58) Field of Classification Search
CPC .......... F23D 14/22; F23D 14/32; F23D 14/84; F23D 2203/102; F23D 2900/00003; F23D 2900/14641; F23D 14/56
(Continued)

(56) References Cited

U.S. PATENT DOCUMENTS 1,603,994 A * 10/1926 Steelman .................. C03B 7/08
65/165
5,472,175 A 12/1995 Showalter et al.
(Continued)

FOREIGN PATENT DOCUMENTS

DE       197 50 704     5/1999

OTHER PUBLICATIONS

International Search Report for corresponding PCT/EP2020/051648, Apr. 20, 2020.

*Primary Examiner* — Allen R. B. Schult
*Assistant Examiner* — William C Weinert
(74) *Attorney, Agent, or Firm* — Elwood L. Haynes

(57) ABSTRACT

Post-mix burner and use of same for generating a flame curtain, the burner having a longitudinal central dividing wall (5) terminating in a wall head (7) towards the burner top (4), an oxidant inlet compartment (102) and an oxidant outlet compartment (103) on a first side of the central wall (5), a fuel inlet compartment (202) and a fuel outlet compartment on the opposite side of the central wall (5); the wall
(Continued)

head (7) presenting a first set of oxidant outlet passages (107) and a second set of fuel outlet passages (207) terminating respectively in first oxidant ejection openings (100) and second fuel ejection openings (200) in an ejection surface (10) at the burner top (4), the oxidant and fuel ejection openings (100, 200) each extending in the longitudinal direction along the ejection surface (10).

13 Claims, 9 Drawing Sheets

(58) Field of Classification Search
USPC .................................. 431/8, 160, 187, 354
See application file for complete search history.

(56) References Cited

U.S. PATENT DOCUMENTS

| 2007/0048685 | A1* | 3/2007 | Kuenzler | F23D 14/78 |
| | | | | 431/328 |
| 2015/0000343 | A1* | 1/2015 | Lefrere | F23C 3/004 |
| | | | | 431/174 |

* cited by examiner

FIG. 9

COMPACT FLAME-CURTAIN BURNER

CROSS REFERENCE TO RELATED APPLICATIONS

This application is a 371 of International Application No. PCT/EP2020/051648, filed Jan. 23, 2020, which claims priority to European Patent Application No. 19305381.6, filed Mar. 26, 2019, the entire contents of which are incorporated herein by reference.

BACKGROUND

The present invention relates to post-mix burners, and in particular to post-mix burners used to generate flame curtains.

Such flame curtains are used in a range of flame-treatment processes, such as glass finishing (reburning or polishing) or the annealing of special coating layer or to improve mechanical properties and/or lighten the product.

It is in particular known in the art to generate flame curtains by means of post-mix linear burners with a large number of individual fuel and oxidant injectors arranged in the longitudinal direction of the flame curtain.

Burners are devices which are used to combine a fuel and an oxidant for the combustion of said fuel by means of the oxidant. In the case of post-mix burners, the fuel and oxidant are injected separately into a combustion zone located downstream of the burner so that the fuel and the oxidant first come into contact with one another in said downstream combustion zone where the combustion takes place. Post-mix burners thus differ from pre-mix burners which inject a mixture of fuel and oxidant into the downstream combustion zone.

For many flame-treatment processes it is important that the flame treatment is homogeneous along the length of the flame curtain, which requires the flame shape and velocity to be substantially the same along the flame curtain length.

In addition, due to space restrictions it is often desirable or even indispensable to achieve such a flame curtain by means of compact and/or light-weight easy-to-operate burners.

SUMMARY

The aim of the present invention is to provide an improved burner which meets the above requirements, at least in part.

Thereto, the present invention proposes a linear post-mix burner which extends between a burner bottom and a burner top over a height H and, in a longitudinal direction, between a first burner end and a second burner end over a length L.

The burner according to the invention presents a central dividing wall which extends, on the one hand, from said burner bottom to the burner top and, on the other hand and in the longitudinal direction, from the first burner end to the second burner end.

The central dividing wall comprises, towards the burner top, a wall head which equally extending in the longitudinal direction and which terminates in an ejection surface at the burner top.

The burner has a first inlet t adjacent the burner bottom and located on a first side of the central dividing wall. The burner also has a second inlet compartment adjacent the burner bottom on a second side of the central dividing wall, which second side is situated opposite the first side with respect of the central wall.

Similarly, the burner has a first outlet compartment adjacent the burner top on the first side of the central dividing wall and a second outlet compartment adjacent the burner top on the opposite second side of the central dividing wall.

The central dividing wall thus separates the first inlet compartment from the second inlet compartment and the first outlet compartment from the second outlet compartment.

The first inlet compartment is separated from the first outlet compartment by a first separation plate extending from the central dividing wall on the first side thereof. The second inlet compartment is separated from the second outlet compartment by a second separation plate which extends from the central dividing wall on the second side thereof.

A first fluid inlet leads into the first inlet compartment and a second fluid inlet leads into the second inlet compartment, the first inlet being adapted for the supply of a first fluid from outside the burner into the first inlet compartment and the second inlet being adapted for the supply of a second fluid from outside the burner into the second inlet compartment.

A first set of multiple first through passages is provided in the first separation plate between the first inlet compartment and the first outlet compartment. Said first set of first through passages extends in the longitudinal direction, preferably over the entire length of the first separation plate. These first through passages fluidly connect the first inlet compartment to the first outlet compartment so that a first fluid introduced into the first inlet compartment via the first fluid inlet can flow from the first inlet compartment into the first outlet compartment via said first through passages.

The second separation plate, which separates the second inlet compartment from the second outlet compartment, similarly presents a second set of multiple second through passages. The second set likewise extends in the longitudinal direction, preferably over the entire length of the second separating wall. The second through passages fluidly connect the second inlet compartment to the second outlet compartment and, when a second fluid is supplied to the second inlet compartment via the second outlet, said second fluid can flow from the second inlet compartment into the second outlet compartment via said second through passages.

In the wall head of the central dividing wall there is provided a first set of first outlet passages and a second set of second outlet passages which terminate respectively in first ejection openings and second ejection openings in the ejection surface at the burner top. The first ejection openings and the second ejection openings each extend along the longitudinal direction in the ejection surface of the burner. The first outlet passages fluidly connect the first outlet compartment to an area downstream of the burner top and thus downstream of the burner. The second outlet passages in turn fluidly connect the second outlet compartment with said downstream area. Thus when the first fluid is introduced into the first outlet compartment via the first through passages, said first fluid can be ejected from the first outlet compartment into the downstream area via the first outlet passages and their first ejection openings. When the second fluid is introduced into the second outlet compartment via the second through passages, the second fluid can be ejected from the second outlet compartment into the downstream area via the second outlet passages and their second ejection openings. When the first fluid is a combustion oxidant and the second fluid is a fuel, a flame curtain can thus be generated inside the downstream zone when the ejected fuel is burnt with the ejected combustion oxidant.

In the present context, a multitude of elements, such as openings and passages, are said to extend in the longitudinal direction when the multitude of elements together form a row or band of elements which extends in said longitudinal direction.

Non-homogeneous flame curtains arise in particular when a post-mix burner presents a preferential fluid flow path between a fluid inlet and only some of the corresponding fluid ejection openings.

It is known in the art to reduce preferential flow path formation by using a large buffer volume between the fluid inlet and the multiple fluid ejection openings. This is, however, not an option when compact burners are required.

It is also known in the art to reduce preferential flow path formation by increasing the pressure losses in the outlet passages, for example by reducing the flow cross section of the outlet passages. Most manufacturing processes cannot produce flow passages with sufficient accuracy below certain dimensions and the technologies required to produce flow passages with very small cross sections are generally more expensive. In addition, the flow cross section of the outlet passages must still enable sufficient fluid to be ejected via the individual outlet passages. Consequently, there is a limit to the extent to which increased pressure losses in the outlet passages can be used to reduce preferential flow path formation.

In accordance with the present invention, a further step for preferential flow path formation is used in that the respective fluids are first supplied to an inlet compartment of the burner and in that, from said inlet compartment, the fluid is distributed over a first set of multiple through passages via which the fluid is introduced into a second compartment before being ejected via the multitude of outlet passages for said fluid. As the set of through passages between the inlet compartment and the outlet compartment extends in the longitudinal direction of the burner, the fluid is already distributed along said longitudinal direction before entering the outlet compartment, thus substantially avoiding preferential flow path formation in said outlet compartment.

According to a particular embodiment of the present invention, the first inlet compartment has a volume which is greater than the volume of the first outlet compartment and/or the second inlet compartment has a volume which is greater than the volume of the second outlet compartment, preferably both. Preferably, the ratio between the internal volume of the first, respectively the second, inlet compartment to the internal volume of the first, respectively the second, outlet compartment is between 1 and 3, and more preferably between 1.5 and 2.5. Such an embodiment ensures a more even distribution of the flow of the first and/or second fluid from the first respectively second inlet compartment to the first respectively second outlet compartment via the first respectively second through passages therebetween.

Preferential flow path formation in an inlet compartment can also be reduced when the set of through passages which fluidly connect the inlet compartment with the corresponding outlet compartment comprises multiple spaced apart rows of said through passages, whereby said rows again extend in the longitudinal direction, for example: one row of through passages in the plate adjacent the central dividing wall and another row of through passages on the other side of said plate, in particular adjacent a longitudinal outer wall of the burner.

Thus, in the burner according to the present invention:
the first set of first through passages advantageously comprises multiple spaced apart rows of first through passages, said rows of first through passages extending in the longitudinal direction,
and/or
the second set of second through passages advantageously comprises multiple spaced apart rows of second through passages, said rows of second through passages extending in the longitudinal direction.

The burner according to the invention typically has a single fluid inlet for each inlet compartment of the burner, i.e. a single oxidant inlet and a single fuel inlet. Such burners can therefore easily be incorporated in most installations requiring the use of a flame curtain. The fluid inlets typically have an internal diameter from 5 to 50 mm. They may, in particular have inlets with standard dimensions recommended for the technology and/or in the territory concerned. Habitual connections between the burner and a fluid source may thus be used without any need for special or voluminous adapters.

The fluid inlet is typically positioned near or at the longitudinal middle of the inlet compartment. In order to limit the space requirements of the burner of the invention, the fluid inlet of the first inlet compartment may be located slightly on one side of the longitudinal middle of the burner, with the fluid inlet of the second inlet compartment being located slightly on the other side of the longitudinal middle of the burner. In that case, the two inlets can be positioned with respect to one another so that the width of the burner at this point is less than the sum of the outer diameters of the two inlets.

In some cases, an inlet compartment may be provided with more than one fluid inlet. However, this requires an adapted fluid supply installation suitable for supplying two controlled fluid flows to said inlet compartment.

The burner according to the present invention preferably presents some degree of symmetry with respect to the central dividing wall, which also provides for a simpler design.

Thus, the first inlet compartment is preferably located opposite the second inlet compartment with respect to the central dividing wall and/or the first outlet compartment is located opposite the second outlet compartment with respect to the central dividing wall.

When the respective flow rates of the fuel and oxidant allow, the first inlet compartment may advantageously be symmetric to the second inlet compartment with respect to the central dividing wall and/or the first outlet compartment may advantageously be symmetric to the second outlet compartment with respect to the central dividing wall.

When the respective flow rates of the fuel and oxidant allow, the burner is preferably symmetric with respect to the central dividing wall, with the possible exception of the first and second fluid inlets as discussed above.

The outlet passages out of the second compartment typically have an inner diameter or flow section of 0.3 to 3 mm and preferably of 0.5 to 1.5 mm. As discussed above, smaller flow cross sections increase the pressure loss over the individual outlet passages and help prevent the formation of preferential flow paths in the corresponding outlet compartment. The inner diameters of the outlet passages are also selected in function of the required flow rate and flow velocity through said outlet passages. Consequently, the inner diameter of the outlet passages for the first fluid (first outlet passages leading out of the first outlet compartment) may differ from the inner diameter of the outlet passages for the second fluid (second outlet passages leading out of the second outlet compartment).

Advantageously, the inner diameters of the outlet passages are selected so that, during operation of the burner, the ratio of the gaseous fuel injection velocity into the area downstream of the burner top over the oxidant injection velocity into said area lies in the range of 0.5 to 1.50 and preferably in the range of 0.8 to 1.2.

As indicated above the ejection openings of the first and of the second set of outlet passages extend in the longitudinal direction of the burner along the ejection surface at the burner top.

According to one particular embodiment of the burner of the present invention, the burner presents one or more rows in the longitudinal direction of the first ejection openings and one or more rows in the longitudinal direction of the second ejection openings. In that case, the first ejection openings extend in one or more first rows in the longitudinal direction and the second ejection openings extend in one or more second rows in the longitudinal direction, said first and second rows being thus parallel to one another. According to this embodiment, the burner advantageously presents alternating first and second rows. In order to ensure complete combustion of the fuel, the outermost rows of ejection openings are used to inject combustion oxidant. Thus, when the first ejection openings are used to inject combustion oxidant and the second ejection openings are used to inject gaseous fuel, the outermost rows of ejection openings are preferably first rows i.e. rows of combustion-oxidant injecting first ejection openings.

When the burner comprises multiple first rows and/or multiple second rows, it is important to ensure a substantially uniform distribution of the first, respectively the second fluid across all of the first ejection openings, respectively all of the second ejection openings.

Thereto, it is proposed
that, when the burner comprises multiple first rows of first ejection openings, the first set of first outlet passages comprises multiple substantially fork-shaped first subsets of first outlet passages (said first outlet passages forming the prongs of the fork-shaped first subset), each first subset being located in a plane perpendicular to the longitudinal direction, and
that, when the burner comprises multiple second rows of second ejection openings, the second set of second outlet passages comprises multiple substantially fork-shaped second subsets of second outlet passages (said second outlet passages forming the prongs of the fork-shaped second subset), each second subset being located in a plane perpendicular to the longitudinal direction The first and/or second subsets define a row of first and/or second subsets in the longitudinal direction.

When the burner comprises multiple first and second subsets, the first and the second subsets together advantageously define a row of alternating first and second subsets extending in the longitudinal direction.

For example, when the burner comprises a row of two-pronged fork-shaped first subsets perpendicular to the longitudinal direction (whereby each second subset thus comprises two (2) first outlet passages) in combination with a single row of second outlet passages, it is possible to obtain three (3) rows of outlet openings extending in the longitudinal direction along the ejection surface of the burner: a first row of first ejection openings corresponding to the outlet passages of each first subset nearest to the first outlet compartment, a row of second ejection openings corresponding to the row of second outlet passages and a third row of first ejection openings corresponding to the outlet passages of each first subset furthest from the first outlet compartment. As already indicated earlier, in such a configuration, the outermost rows of first ejection openings are preferably used to inject combustion oxidant into the downstream area.

Each row of first ejection openings and/or each row of second ejection openings preferably comprises 5 to 9 ejection openings per cm in the longitudinal direction, preferably 6 to 7 ejection openings per cm.

The ejection openings of adjacent rows of ejection openings are advantageously in staggered arrangement, which further contributes to a more homogeneous flame curtain.

A flame curtain may also be generated by means of one or more rows of alternating first and second ejection openings extending along the longitudinal direction in the ejection surface at the burner top.

According to one such embodiment with multiple rows of alternating first and second ejection openings:
the first set of first outlet passages comprises multiple substantially fork-shaped first subsets of first outlet passages, each first subset being located in a plane forming a non-zero angle $\Theta$ with the longitudinal direction, and
the second set of second outlet passages comprises multiple substantially fork-shaped second subsets of second outlet passages, each second subset being located in a plane forming said non-zero angle $\Theta$ with the longitudinal direction,
the first and second subsets together defining a row of alternating first and second subsets in the longitudinal direction. Said row of alternating subsets in turn defines multiple rows of alternating first and second ejection openings in the ejection surface of the burner.

For example, when each subset has the form of a two-pronged fork of two outlet passages, two rows of alternating first and second ejection, it is possible to produce a burner having two rows of alternating first and second ejection openings extending in the longitudinal direction in the ejection surface at the burner top.

In order to ensure optimum fuel combustion, the outermost ejection openings of each row of alternating ejection openings are preferably used for the injection of combustion oxidant into the downstream area.

The angle $\Theta$ between the subsets and the longitudinal direction is advantageously between 30° and 60°, preferably between 40° and 50°, most preferably 45°.

According to a preferred embodiment each row of ejection openings comprises 5 to 9 ejection openings per cm in the longitudinal direction, preferably 6 to 7 ejection openings per cm.

As it is an aim of the present invention to be able to generate a substantially homogeneous flame curtain, the first outlet passages and the first ejection openings are typically sized and designed to cause identical flow resistance through each first outlet passage when the first fluid is ejected therethrough into the downstream area and the second outlet passages and the second ejection openings are sized and designed to cause identical flow resistance through each second outlet passage when the second fluid is ejected therethrough into the downstream area. Consequently, when the length of the flow path from the first outlet compartment to the individual first outlet openings varies, the size and/or design of the corresponding first outlet passages may be adapted accordingly. For example a wider inner diameter may be selected for first outlet passages corresponding to longer flow paths compared to the inner diameter of first outlet passages corresponding to shorter flow paths so as to compensate for the pressure losses caused by the longer flow paths.

The length of the burner (i.e. the dimension of the burner in the longitudinal direction) depends on the available space, the intended application and the desired firing rate. For example, for glass polishing, the burner length per kW is usefully between 6 and 8 mm, preferably between 7 to 7.5 mm when the burner comprises two (2) rows of ejection openings in the longitudinal direction. For more rows of outlets hole, the length is reduced accordingly.

Post-mix burners according to the present invention are usually rectilinear in the longitudinal direction. Such burners are frequently referred to as simply linear post-mix burners.

However, the burners according to the invention may also be curved in the longitudinal direction. The manufacture and use of such a curved burner may for example be justified when a large number of objects with curved surfaces, for example bottles, need to be fire polished at sufficiently high speed.

The height of the burner (i.e. the dimension of the burner from the burner bottom to the burner top) and the width of the burner (i.e. the dimension of the burner in the direction perpendicular to the central dividing wall) are typically kept as small as possible (so that minimal space is required for the installation of the burner). The minimum height and the minimum width of the burner are at least in part determined by the dimensions of the first and second inlet compartments and of the first and second outlet compartments which must be sufficiently large to avoid preferential flow paths being formed.

The length of the burner is typically between 10 mm to 500 mm and the width of the burner is typically between 10 to 50 mm.

When the length of the required flame curtain is such that it cannot be achieved with a single burner according to the invention, multiple burners according to the invention can be used to generate said flame curtain, typically in abutting (end-to-end arrangement).

In use one of the first and second fluid inlets of the post-mix burner of the invention is connected to a source of gaseous combustion oxidant and the other of the first and second fluid inlets is connected to a source of gaseous fuel.

Unless indicated or suggested otherwise in what follows, the first fluid inlet is considered to be connected to a source of gaseous combustion oxidant and the second fluid inlet is connected to a source of gaseous fuel.

The gaseous combustion oxidant preferably contains between 50% vol and 100% vol oxygen, more preferably at least 80% vol and most preferably at least 90% vol oxygen.

The gaseous fuel is advantageously selected from natural gas, propane, propylene, acetylene, hydrogen and mixtures of at least two of said gaseous fuels, Thus, the present burner can be operated with a large variety of fuels such as natural gas, propane, propylene, acetylene, hydrogen or a mixture of those fuel like the commercial mixture FLAMAL 29®. The burner is preferably operated with industrial oxygen (purity>90%) but can also operate with oxygen at lower grade down to 50%.

The burner is preferably made of various grades of stainless steel, like 316, 304 or 310 grade stainless steel, and can be made of Inconel advantageously in order to lengthen its lifetime. Indeed, the burner is operating in a harsh environment of very high temperatures. In addition, when using the burner for fire polishing glass or the like, deposits may form on the burner and cause corrosion and/or plugging.

An interesting embodiment of the burner equipped with two lips which protrude outwardly from the burner top towards the downstream area. Said lips extend in the longitudinal direction on either side of the first and second ejection openings in the ejection surface. The lips protect the ejection openings against plugging by deposits and protect the root of the flame curtain.

It will be appreciated that the design of the burner according to the present invention makes said burner highly suited for production by additive manufacturing (commonly referred to as "3D printing"), thus avoiding the need for welding seams and allowing a more precise manufacturing.

The post-mix burner according to the present invention makes it possible to generate substantially homogeneous flame curtains suitable for the fire treatment of various objects, and this may means of compact and/or light-weight easy-to-operate burners.

The present invention also relates to a combustion method by means of a burner according to any one of the embodiments described above.

Said combustion method includes the step of supplying gaseous combustion oxidant to the first fluid inlet of the burner so that the gaseous combustion oxidant flows from the first fluid inlet into the first inlet compartment and from the first inlet compartment via the first through passages into the first outlet compartment and from the first outlet compartment via the first outlet passages and the first ejection openings into the downstream area.

In addition, gaseous fuel is supplied to the second fluid inlet so that the gaseous fuel flows from the second fluid inlet into the second inlet compartment and from the second inlet compartment via the second through passages into the second outlet compartment and from the second outlet compartment via the second outlet passages and the second ejection openings into the downstream area.

Inside the downstream area, the gaseous fuel is combusted with the gaseous combustion oxidant in the form of a flame curtain extending in the longitudinal direction and away from the ejection surface of the burner.

The gaseous fuel is ejected from the second ejection openings into the downstream area with a gaseous fuel injection velocity and the gaseous combustion oxidant is ejected from the first ejection openings into said downstream area with an oxidant injection velocity. According to a preferred embodiment of the method, the ratio between the gaseous fuel injection velocity and the oxidant injection velocity is in the range of 0.5 to 1.50, preferably in the range of 0.8 to 1.2.

As already indicated earlier, the firing rate of the burner may be 1 kW per 6 to 8 mm (measured in the longitudinal direction of the burner), preferably 1 kW per 7 to 7.5 mm.

The generated flame can, for example be used for the fire treatment of an object, in particular a glass or thermoplastic polymer, positioned inside said downstream area, in particular by fire polishing, edge melting and the like.

Edge melting is used to soften sharp edges, for example the rounding of the rim of a drinking glass after cutting. Fire finishing is used to remove surface defects and fire polishing is used to enhance the brightness of the object, for example in the case of premium glass products.

Examples of glass products which may be fire treated by means of the process according to the invention include, but are not limited to spirits bottles, perfume flasks and tableware articles.

The flame curtain may also be used in other fire treatment processes, such as the annealing of certain coatings, the improvement of mechanical properties of particular object and/or lightening of the colour of certain objects.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

Figure 9:
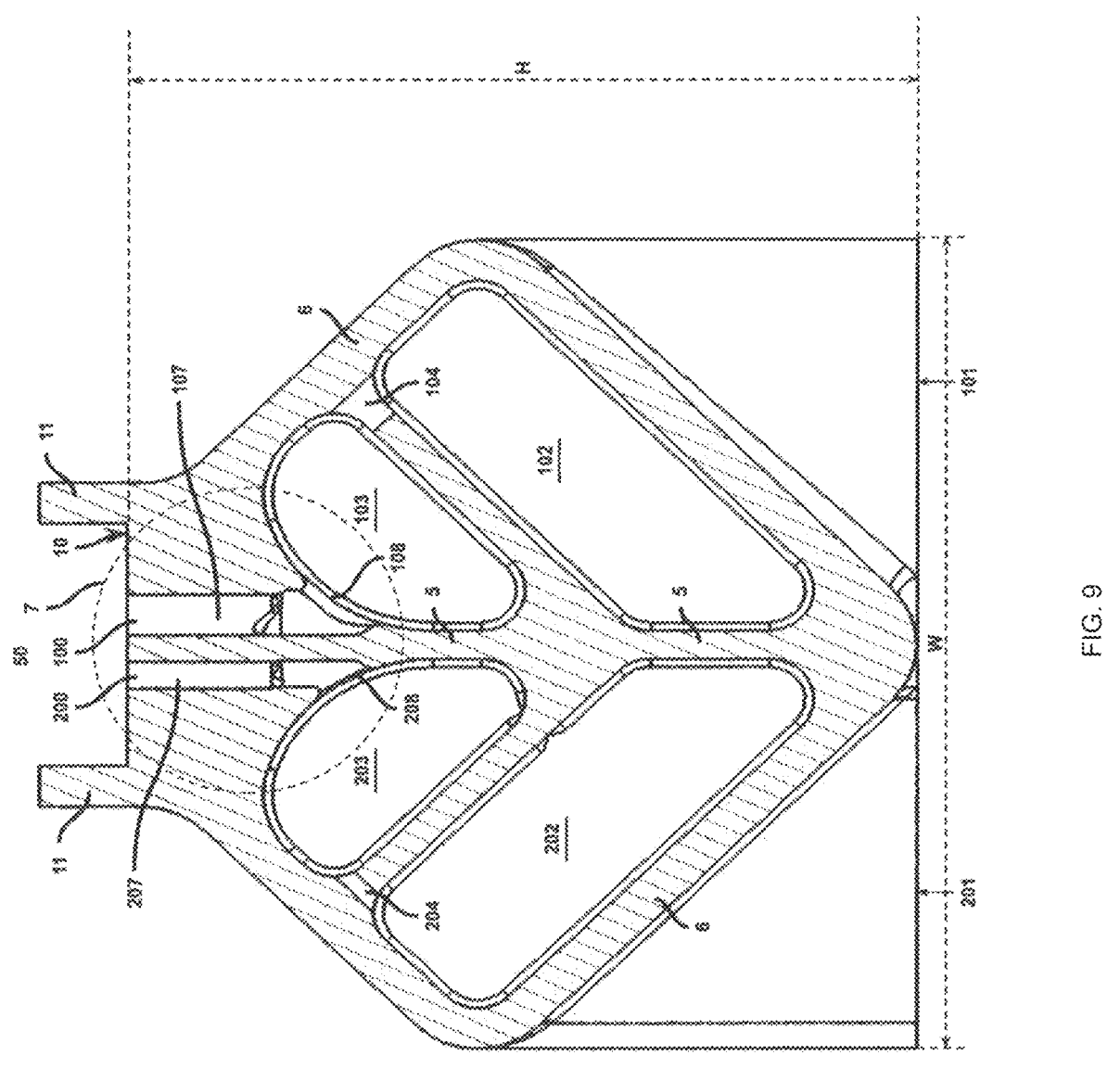

FIG. 9 is a non-perspective cross section view in a plane across an oxidant outlet passage terminating in an oxidant ejection opening in one of the two rows of ejection openings and across the fuel outlet passage terminating in the fuel ejection opening situated opposite said oxidant ejection opening in the other of the two rows of ejection openings.

DETAILED DESCRIPTION OF PREFERRED EMBODIMENTS

Figure 1:
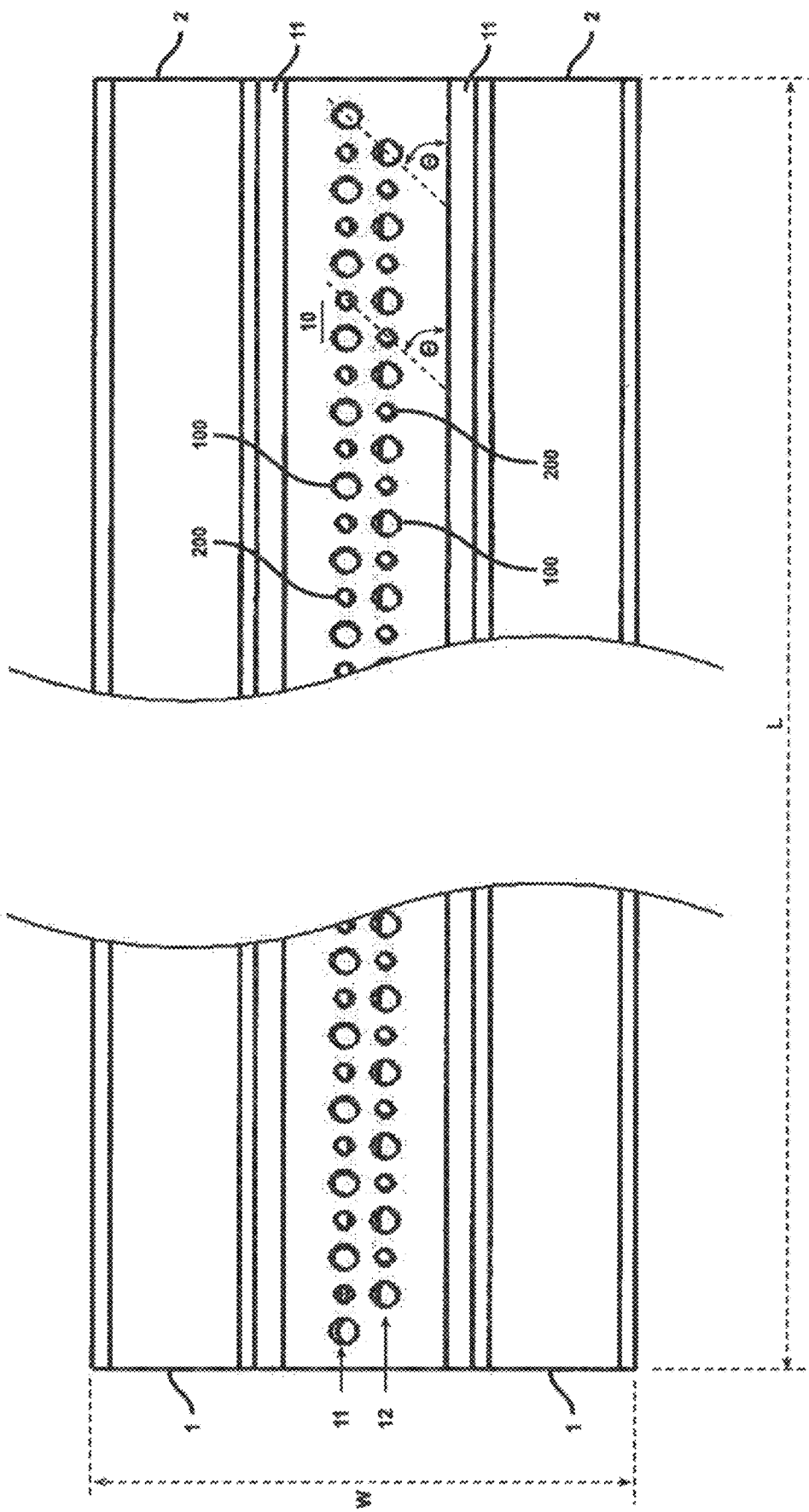
FIG. 1 is an interrupted top view of a specific embodiment of the burner in accordance with the present invention.

The illustrated burner is a 35 kW rectilinear post-mix burner with a length L of 150 mm in the longitudinal direction between a first end 1 and a second end 2, a height H of 18 mm between the burner bottom 3 and the burner top 4 and a width W of 20 mm at the widest point of the burner. The ejection surface 10 at the burner top 4 presents 167 oxidant ejection openings (first ejection openings) 100 for combustion oxidant and 167 fuel ejection openings holes 200 for fuel. Said fuel and oxidant ejection openings are arranged in two parallel rows 11 and 12 in the ejection surface 10. The burner is designed for use with natural gas as fuel and oxygen at more than 90% purity as combustion oxidant. The oxidant ejection openings 100 have an inner diameter of 1 mm and the fuel ejection openings 200 have an inner diameter of 0.6 mm. In each row 11 and 12, oxidant ejection openings 100 alternate with fuel ejection openings 200. Between the adjacent rows 11 and 12, each oxidant ejection opening 100 of one row 11, 12 is located next to a fuel ejection opening 200 of the other row 12, 11. The outermost ejection openings of each row 11, 12 are oxidant ejection openings 100.

The oxidant inlet 101 (first fluid inlet) and the fuel inlet 201 (second fluid inlet) of the burner are located at the burner bottom 3. Both have a diameter D1 of 10.2 mm and a diameter D2 of 0.8 mm. The figure below presents an example of FMT design for 35 kW made of 167 holes for fuel (diameter 0.6 mm) and 167 holes for oxidant (diameter 1 mm) distributed in a staggered arrangement along a 250 mm length (top face in the figure).

Figure 2:
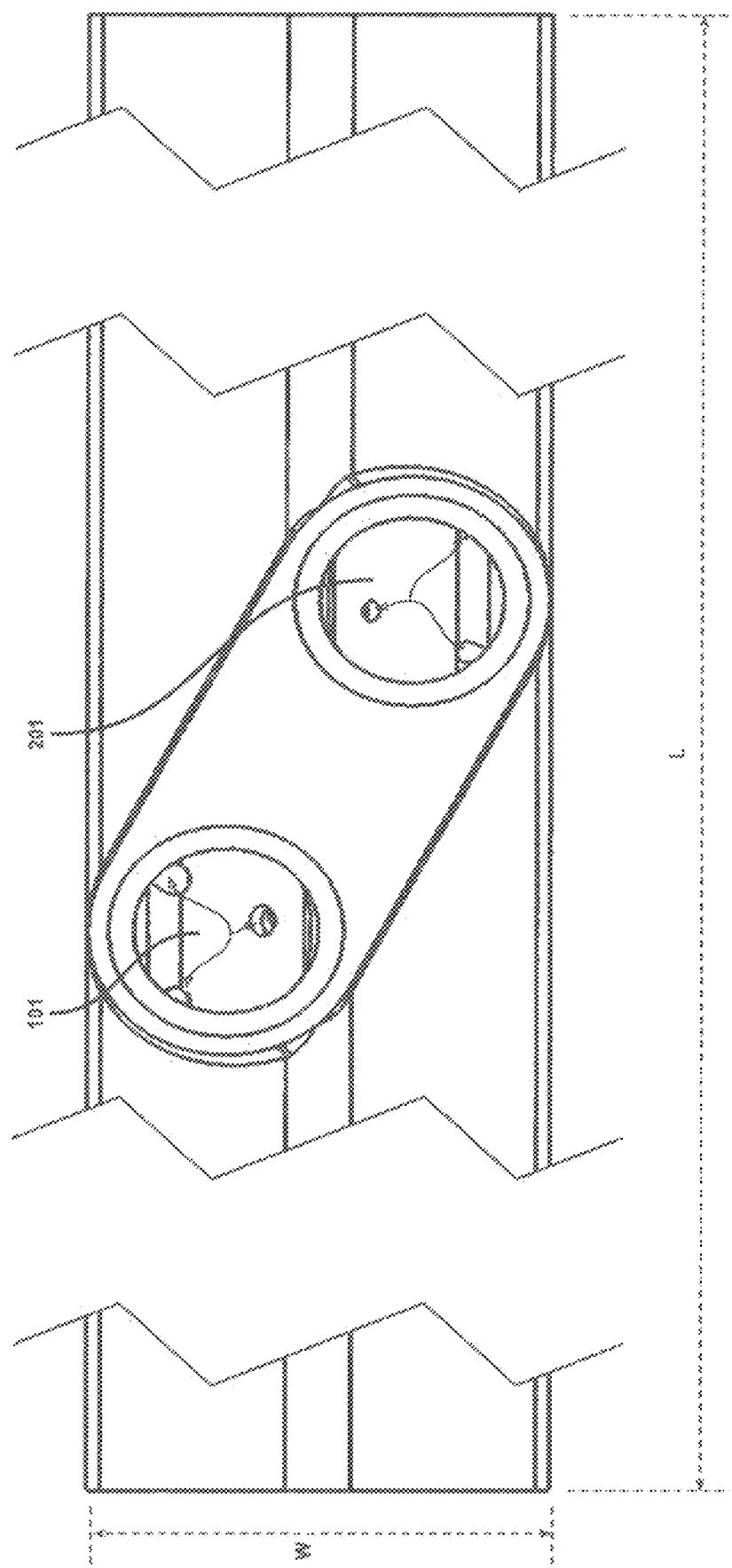
FIG. 2 is an interrupted bottom view of the burner of FIG. 1.
Figure 3:
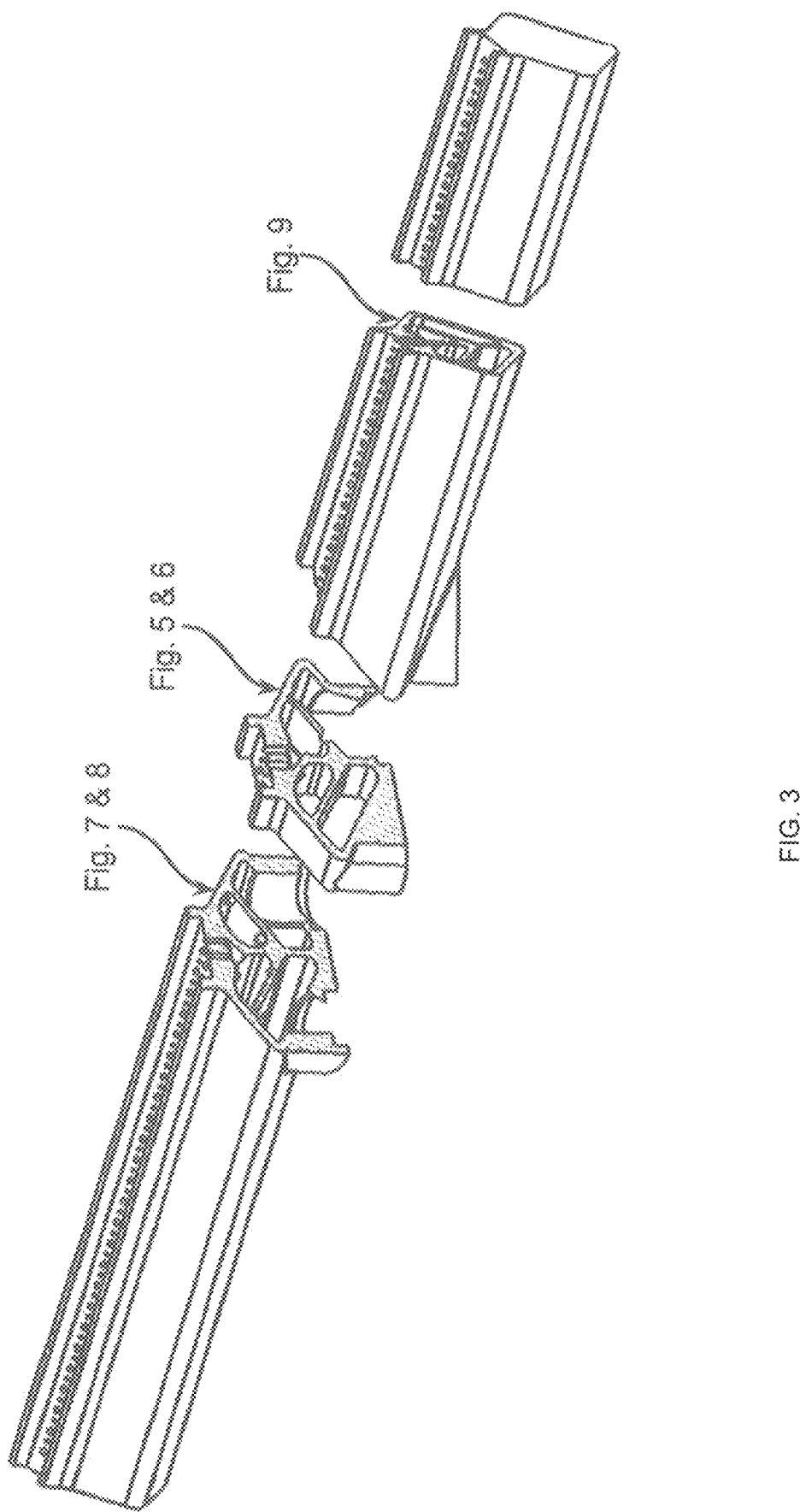
FIG. 3 is an interrupted cut away perspective view of the burner of FIG. 1 showing the location of the vertical cross sections illustrated in FIGS. 5 to 9.
Figure 4:
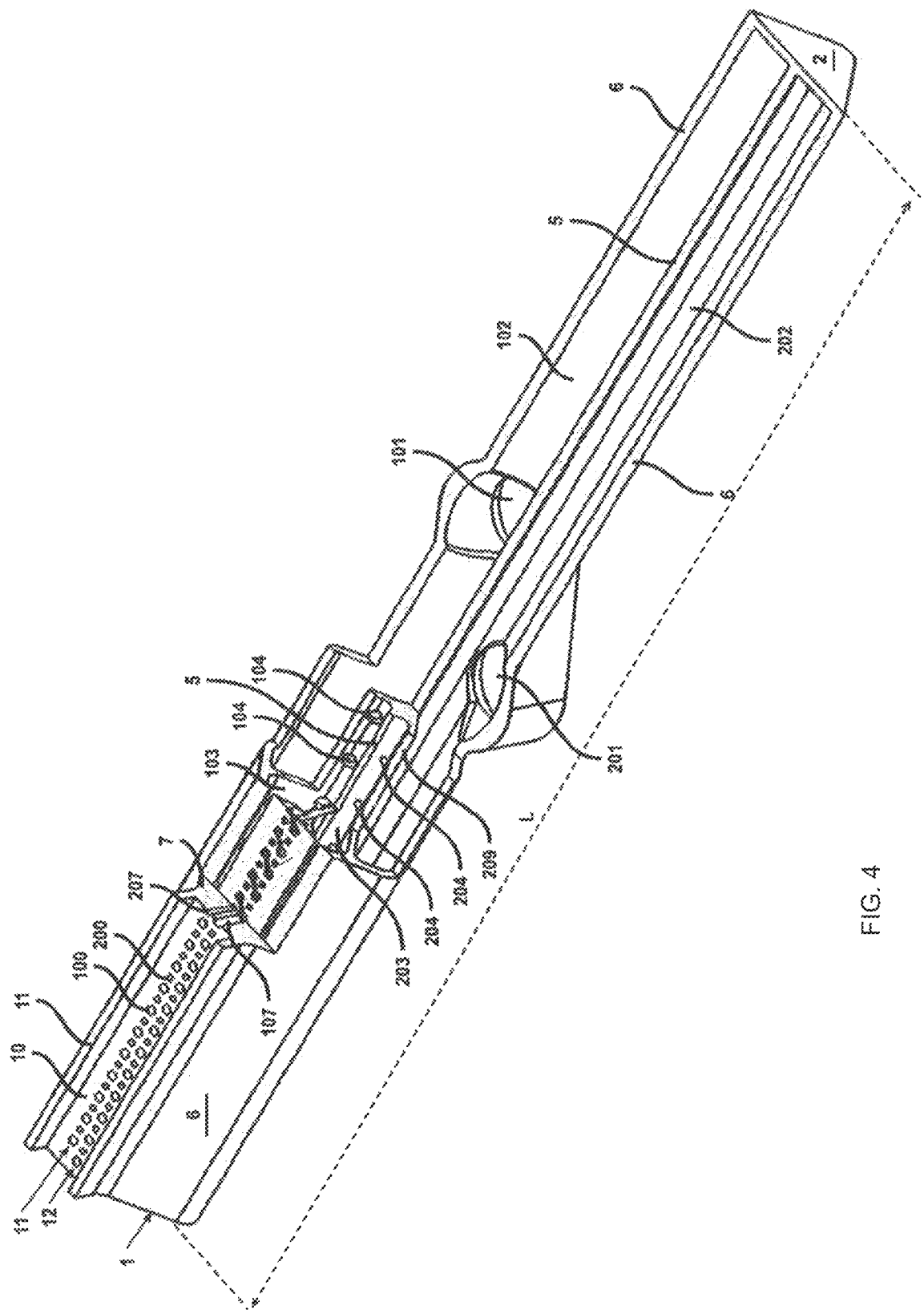
FIG. 4 is a cut away perspective view of the burner of FIG. 1 with horizontal partial cut-aways at various vertical levels of the burner.

As clearly shown in FIGS. 2 and 4, the fluid inlets 101, 102 are positioned with respect to one another at an angle of less than 90° with respect to the longitudinal direction of the burner and are therefore slightly shifted with respect to the longitudinal middle of the burner, one inlet 101 being positioned slightly to one side of the longitudinal middle and the other inlet 102 slightly to the other side of said longitudinal middle. As a consequence, the inlets fit within the width W of the burner, which reduces the space requirements of the burner and enables easier installation of same.

Figure 5:
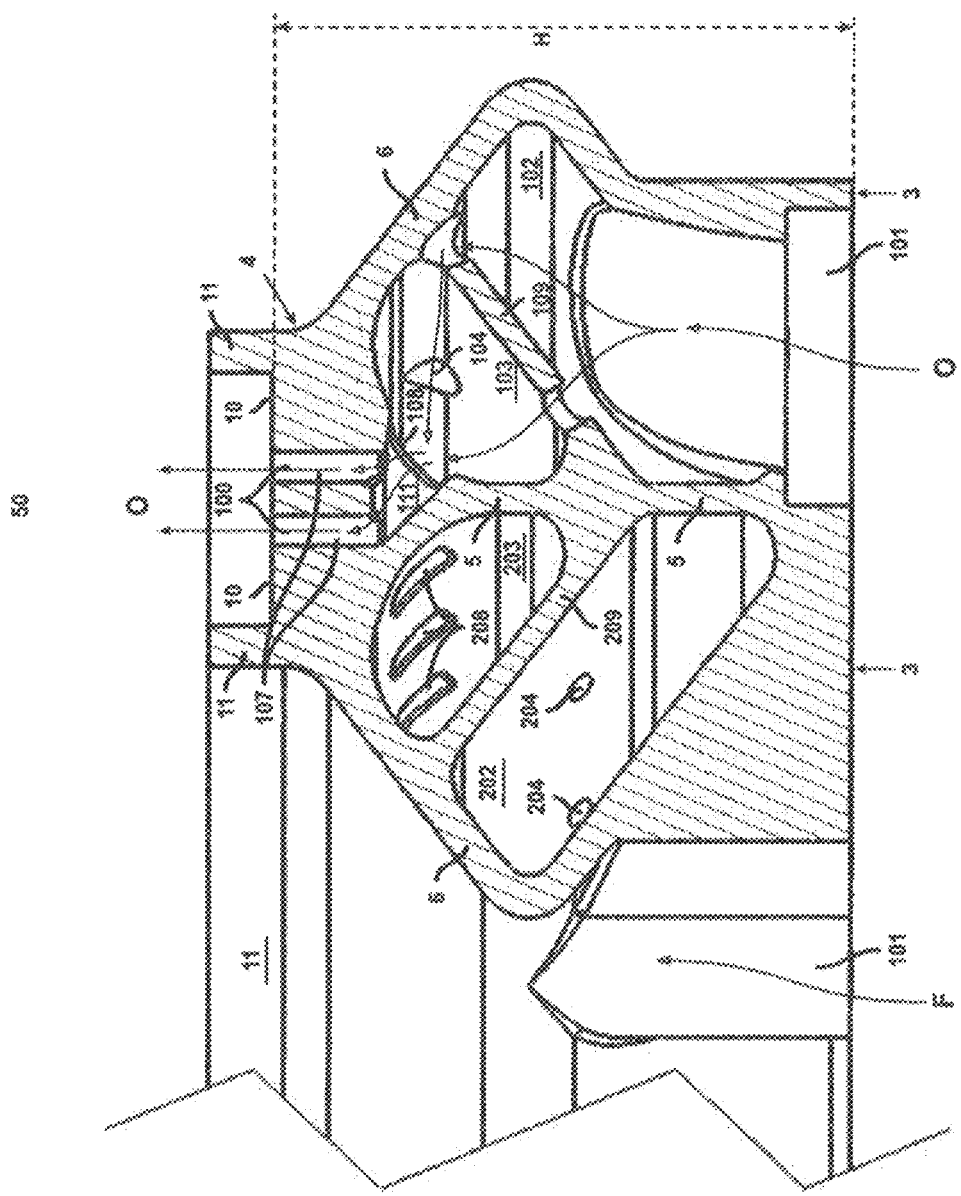
FIG. 5 is an interrupted perspective cross section view of the burner with a vertical cross section across the oxidant inlet and of the burner in a plane across a subset of oxidant outlet passages.
Figure 5:
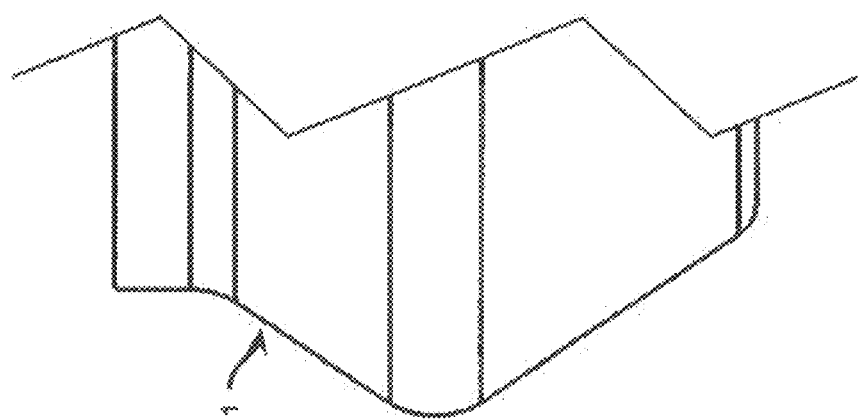
Figure 6:
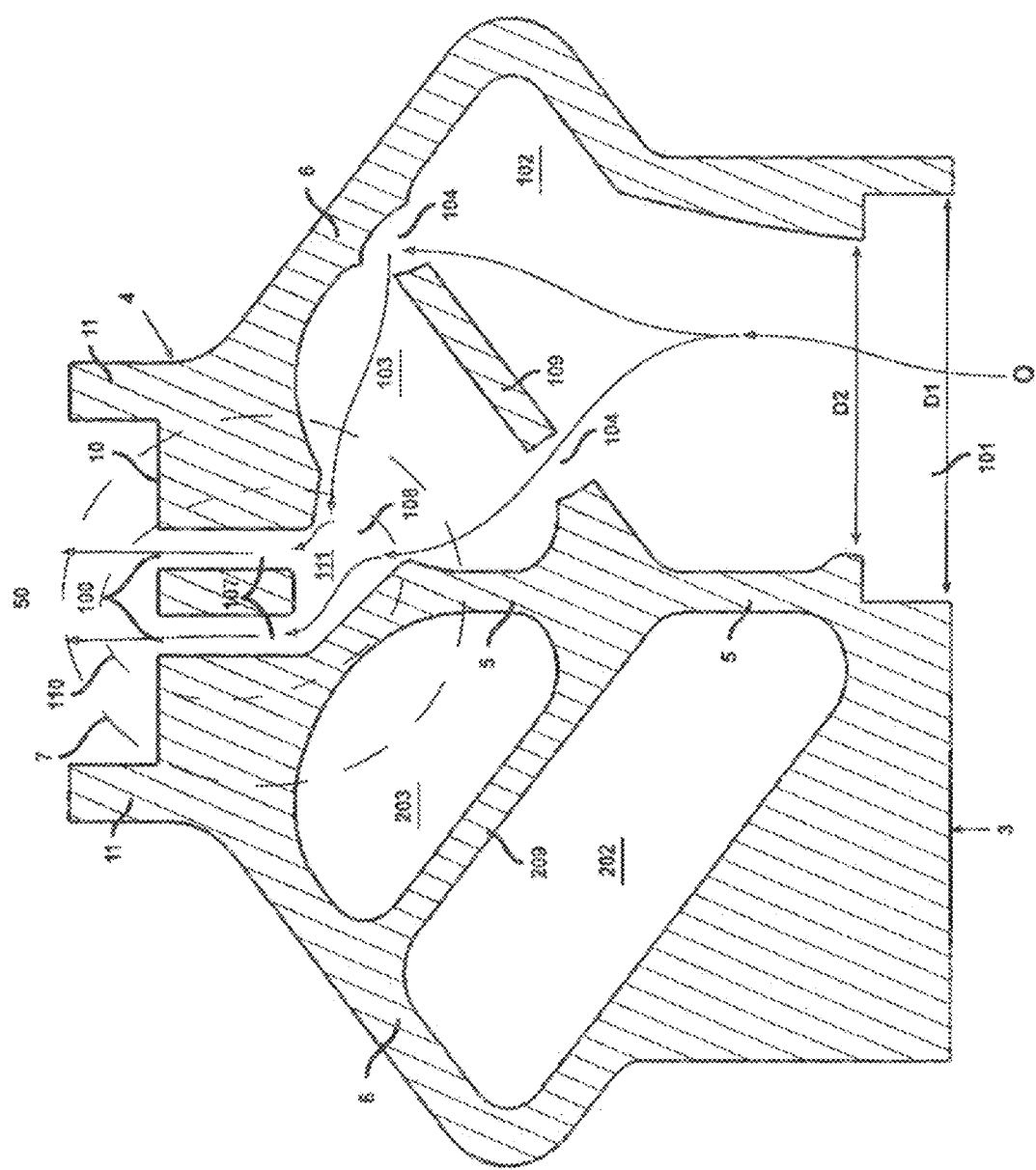
FIG. 6 is a non-perspective cross section view of the burner with a vertical cross section across the oxidant inlet and of the burner in a plane across a subset of oxidant outlet passages.

As illustrated in FIGS. 5 and 6, the oxidant (referred to as O2 in the figures) enters the burner at the burner bottom 3 via oxidant inlet 101 and flows into the oxidant inlet compartment 102. From oxidant inlet compartment 102, the oxidant flows into oxidant outlet compartment 103 via oxidant through passages 104 (first through passages) in the separation plate 109 which separates the oxidant inlet compartment 102 from the oxidant outlet compartment 103. The oxidant through passages 104 are distributed over the entire length L of the burner so that, whereas the oxidant enters the inlet compartment 102 via a single substantially central oxidant inlet 101, said oxidant enters the oxidant outlet compartment 103 in a manner distributed over the entire burner length L. In the illustrated embodiment, oxidant through passages 104 are arranged in two rows extending in the longitudinal direction of the burner: a first longitudinal row of oxidant through passages 104 is located close to the central dividing wall 5 of the burner and a second longitudinal row of oxidant through passages 104 is located adjacent the outer wall 6 of the burner, thus providing for not only a longitudinal distribution of the oxidant feed to the oxidant outlet compartment 103, but also a widthwise distribution of the oxidant feed to the oxidant outlet compartment 103.

From the oxidant outlet compartment 103 the oxidant flows via openings 108 into oxidant outlet passages 107 (first outlet passages) which are located in wall head 7 of central dividing wall 5 and which terminate in the oxidant ejection openings 100 in the ejection surface 10 at the burner top 4. The oxidant outlet passages 107 (as well as the openings 108 leading to same from the oxidant outlet compartment) are evenly distributed over the length L of the burner.

In the illustrated embodiment, the oxidant ejection openings 100 are located in two parallel rows 11 and 12, which also contain fuel ejection openings 200.

In order to distribute the oxidant from the oxidant outlet compartment 103 over the outlet passages 107 of the two rows of ejection openings, two-pronged fork-shaped oxidant subsets 110 (first subsets) of oxidant outlet passages 107 are present, said subsets forming a 45° angle with the longitudinal direction of the burner. Each oxidant subset 110 is supplied with oxidant from oxidant outlet compartment 103 via one of the oxidant openings 108. Inside each subset 110, the oxidant is divided over the two oxidant outlet passages 107 forming the prongs of the fork-shaped structure before being ejected into the downstream area 50, one of the two oxidant outlet passages 107 terminating in an oxygen ejection opening 100 in one of the two rows 11, 12 and the other of the two oxidant outlet passages 107 terminating in an oxidant ejection opening 100 in the other of the two rows 12,11.

Figure 7:
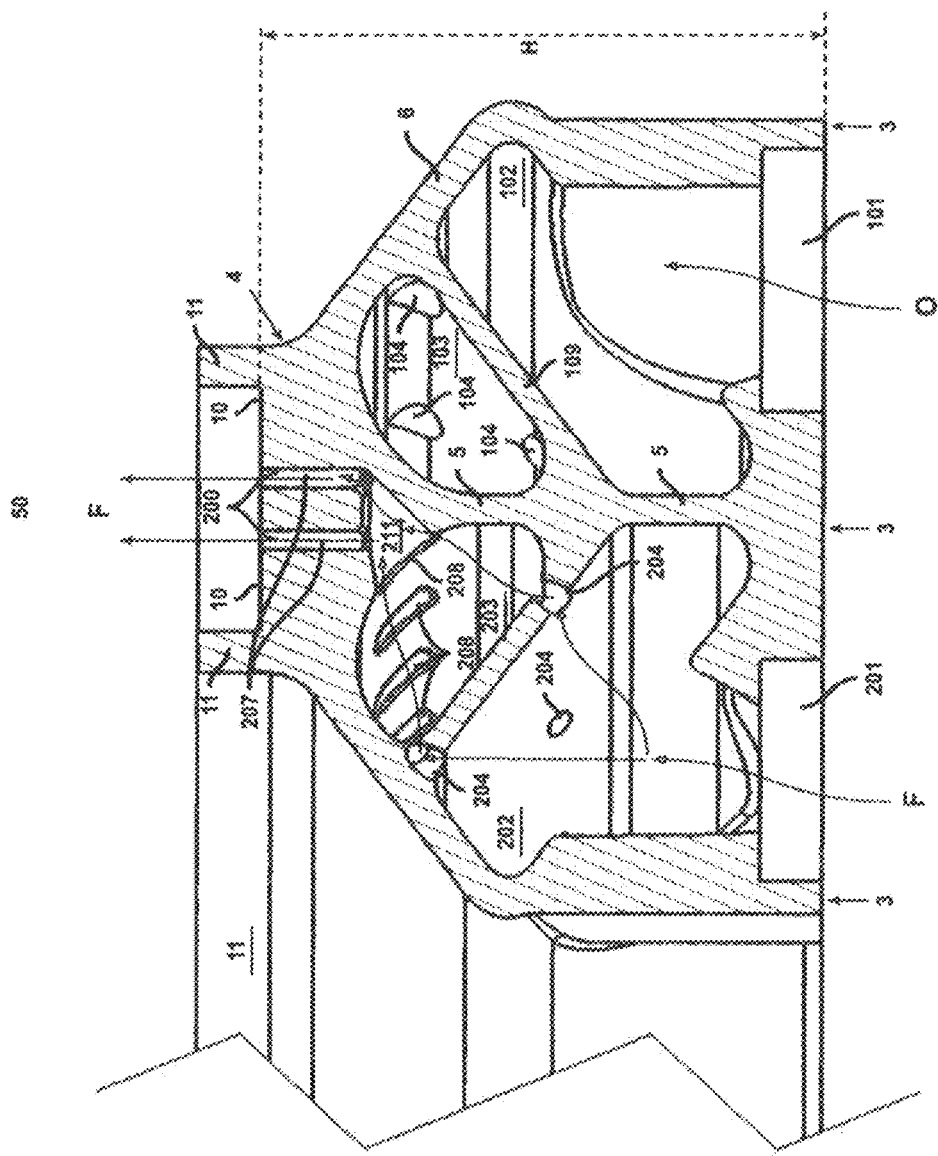
FIG. 7 is an interrupted perspective cross section of the burner with a vertical cross section across both the fuel and the oxidant inlets of the burner and in a plane across a subset of fuel outlet passages.
Figure 7:
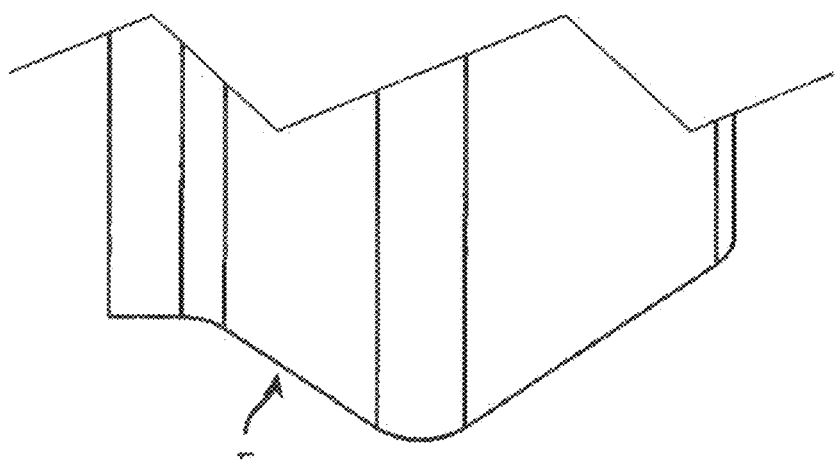
Figure 8:
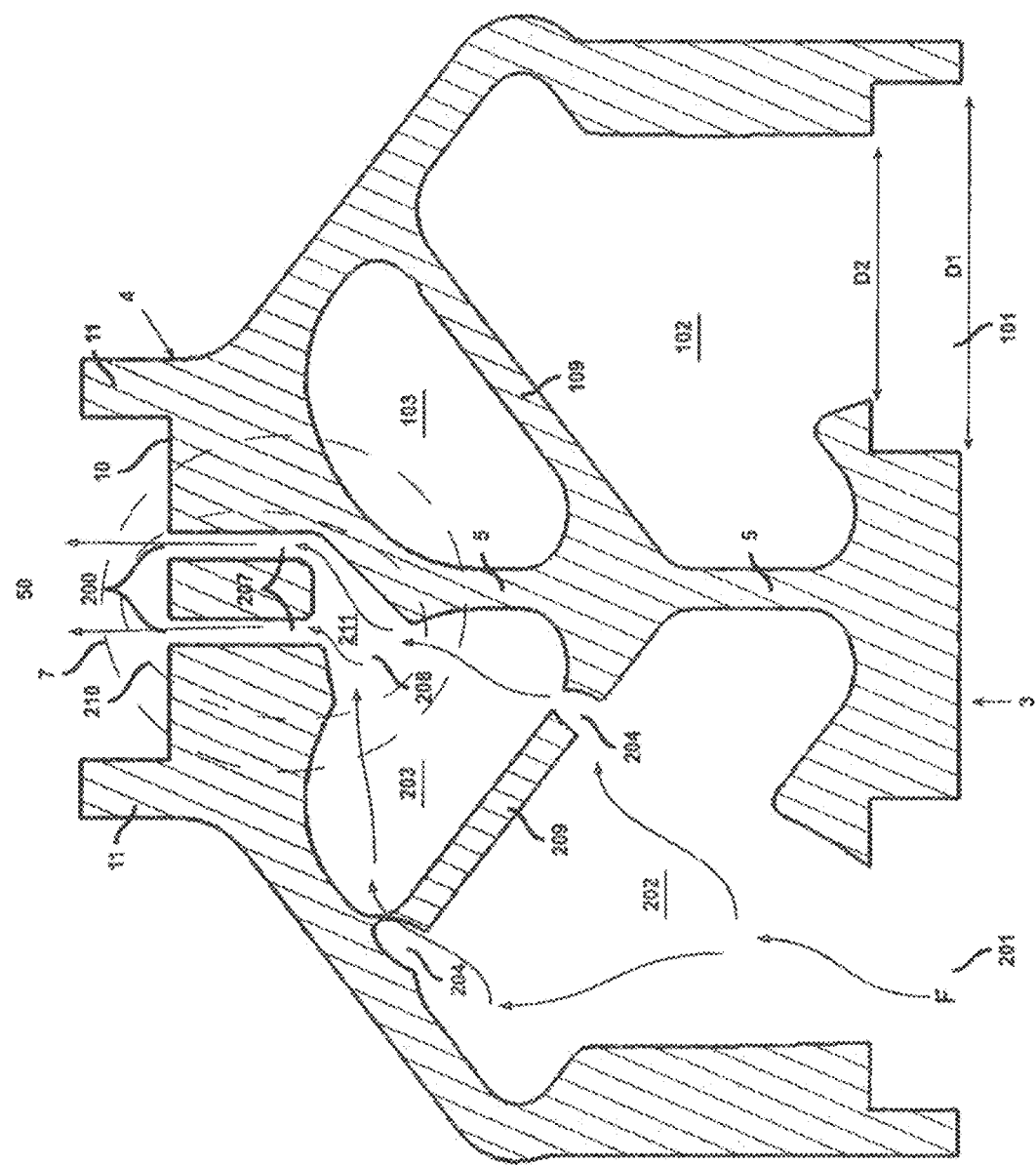
FIG. 8 is a non-perspective cross section view of the burner with a vertical cross section across both the fuel and the oxidant inlets of the burner and in a plane across a subset of fuel outlet passages.

Similarly, as illustrated in FIGS. 7 and 8, the fuel (referred to as F in the figures) enters the burner at the burner bottom 3 via fuel inlet 201 (second fluid inlet) and flows into the fuel inlet compartment 202 (second inlet compartment). From fuel inlet compartment 202, the fuel flows into fuel outlet compartment 203 (second outlet compartment) via fuel through passages 204 (second through passages) in separation plate/wall 209 which are distributed over the entire length L of the burner in two longitudinal rows: a first longitudinal row close to the central dividing wall 5 of the burner and a second longitudinal row adjacent the outer wall 6 of the burner.

From the fuel outlet compartment 203, the fuel flows via openings 208 into fuel outlet passages 207 (second outlet passages) which are located in wall head 7 of central dividing wall 5 and which terminate in the fuel ejection openings 200 in the ejection surface 10 at the burner top 4. The fuel outlet passages 207 are evenly distributed over the length L of the burner. The two parallel rows 11 and 12 contain an alternating arrangement of fuel ejection openings 200 and oxidant ejection openings 100.

In order to distribute the fuel over the outlet passages 207 of said rows 11, 12, two-pronged fork-shaped fuel subsets 210 (second subsets) of fuel outlet passages 207 are provided. The fuel subsets 210 are parallel with the oxidant subsets 110 and thus also form a 45° angle with the longitudinal direction of the burner. Together, the oxidant and fuel subsets 110, 210 form a row of alternating oxidant and fuel subsets extending in the longitudinal direction. Inside each fuel subset 210, the fuel is divided over the two fuel outlet passages 207 forming the prongs of the fork-shaped structure before being ejected into the downstream area 50. One of said two fuel outlet passages 207 terminates in a fuel ejection opening 200 in one of the two rows 11, 12 and the other of the two fuel outlet passages 207 terminating in a fuel outlet opening 200 of the other of the two rows 12,11.

Due to the row of alternating oxidant and fuel subsets 110, 210, oxidant ejection openings 100 and fuel ejection openings 200 alternate within each row 11 and 12. In addition, due to the 45° angle of the subsets with the longitudinal direction the fuel ejection openings 200 of one of the rows 11, 12 is located next to an oxidant ejection opening 100 of the other of the two rows 12,11 and vice versa.

Inside the downstream area 50, the fuel ejected via the fuel ejection openings 200 mixes with the oxidant ejected via the oxidant ejection openings 100 so that a flame curtain is formed inside the downstream area 50, said flame curtain extending from the ejection surface 10 of the burner, on the one hand, away from said ejection surface 10 and, on the other hand, in the longitudinal direction of the burner.

In the illustrated burner, the ejection openings and the root of the flame curtain are protected by two lips 11 which extend along the longitudinal edges of the ejection surface 10.

When the fork-shaped structure of an oxidant or fuel subset 110, 210 has more than two, or even more than three prongs, corresponding to more than two, respectively more than three outlet passages 107, 207, due care is taken to distribute the oxidant O from oxidant outlet compartment 103, respectively the fuel F from fuel outlet compartment 203, in a substantially uniform manner over the outlet passages 107, 207 forming the prongs of the fork-shaped structure. Thereto, the fork-shaped structure can be provided with a common base volume 111, 211 with which the outlet passages 107, 207 are in fluid communication, the base volume 111, 211 acting as a distribution chamber for the oxidant O, respectively the fuel F towards the outlet passages 107, 207. The shape of the base volume 111, 211 and of openings 108, 208 may be adapted for that purpose. For example. openings 108, 208 may be narrower in the vicinity of the outlet passage 107, 207 and wider further away from the outlet passage 107, 207 so as to avoid creating a preferential pathway of the fluid O, F towards the outlet passage 107, 207 closest to opening 108, 208 over the other outlet passages 107, 207 of the same subset 110, 210.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A post-mix burner extending between a burner bottom and a burner top and in a longitudinal direction between a first burner end and a second burner end, the burner comprising:

a central dividing wall extending from the burner bottom to the burner top and, in the longitudinal direction, from the first burner end to the second burner end, the central dividing wall comprising, towards the burner top, a wall head extending in the longitudinal direction and terminating in an ejection surface at the burner top;

a first inlet compartment adjacent the burner bottom on a first side of the central dividing wall and a second inlet compartment adjacent the burner bottom on a second side of the central dividing wall opposite the first side;

a first outlet compartment adjacent the burner top on the first side of the central dividing wall and a second outlet compartment adjacent the burner top on the second side of the central dividing wall, the first inlet compartment being separated from the first outlet compartment by a first separation plate extending from the central dividing wall on the first side thereof and the second inlet compartment being separated from the second outlet compartment by a second separation plate extending from the central dividing wall on the second side thereof;

a first fluid inlet leading into the first inlet compartment and adapted for the supply of a first fluid into the first inlet compartment from outside the burner and a second fluid inlet leading into the second inlet compartment and adapted for the supply of a second fluid into the second inlet compartment from outside the burner;

whereby the first separation plate presents a first set of multiple first through passages fluidly connecting the first inlet compartment to the first outlet compartment, said first set of first through passages extending in the longitudinal direction;

the second separation plate presents a second set of multiple second through passages fluidly connecting the second inlet compartment to the second outlet compartment, said second set of second through passages extending in the longitudinal direction;

the wall head presents a first set of first outlet passages and a second set of second outlet passages terminating respectively in first ejection openings and second ejection openings in the ejection surface, the first outlet passages fluidly connecting the first outlet compartment to an area downstream of the burner top and the second outlet passages fluidly connecting the second outlet compartment to said downstream area, the first and second ejection openings each extending in the longitudinal direction in the ejection surface;

whereby the first and second separation plates, and the first and second sets of through passages, are configured to provide substantially uniform longitudinal flow distribution of the first and second fluids, respectively, prior to ejection from the election openings.

2. The burner according to claim 1, whereby the first inlet compartment has a volume which is greater than the volume of the first outlet compartment and/or whereby the second inlet compartment has a volume which is greater than the volume of the second outlet compartment.

3. The burner according to claim 1, whereby the first set of first through passages comprises multiple spaced apart rows of first through passages, said rows of first through passages extending in the longitudinal direction and/or whereby the second set of second through passages comprises multiple spaced apart rows of second through passages, said rows of second through passages extending in the longitudinal direction.

4. The burner according to claim 1, whereby the first ejection openings in the ejection surface extend in one or more than one first rows in the longitudinal direction, whereby the second ejection openings in the ejection surface extend in one or more second rows in the longitudinal direction and whereby the outermost rows are both first rows.

5. The burner according to claim 4,
whereby the first set of first outlet passages comprises multiple fork-shaped first subsets of first outlet passages, each first subset being located in a plane perpendicular to the longitudinal direction,
whereby the second set of second outlet passages comprises multiple fork-shaped second subsets of second outlet passages, each second subset being located in a plane perpendicular to the longitudinal direction,
the first and second subsets together defining in the longitudinal direction a row of alternating first and second subsets.

6. The burner according to claim 1, whereby the first ejection openings and the second ejection openings together form one or more rows in the longitudinal direction, whereby, in each of said one or more rows, first ejection openings alternate with second ejection openings.

7. The burner according to claim 6,
whereby the first set of first outlet passages comprises multiple fork-shaped first subsets of first outlet passages, each first subset being located in a plane forming a non-zero angle Θ with the longitudinal direction, and
whereby the second set of second outlet passages comprises multiple fork-shaped second subsets of second outlet passages, each second subset being located in a plane forming said non-zero angle Θ with the longitudinal direction,
the first and second subsets together defining a row of alternating first and second subsets in the longitudinal direction.

8. The burner according to claim 7, whereby 30°<Θ<60°.

9. The burner according to claim 1, further comprising two lips protruding outwardly from the burner top towards the downstream area and extending in the longitudinal direction on either side of the first and second ejection openings in the ejection surface.

10. The burner according to claim 1, whereby the first fluid inlet is fluidly connected to a source of a gaseous combustion oxidant and whereby the second fluid inlet is fluidly connected to a source of a gaseous fuel.

11. The burner according to claim 10, whereby the gaseous combustion oxidant contains at between 50% vol and 100% vol oxygen and/or whereby the gaseous fuel is selected from natural gas, propane, propylene, acetylene, hydrogen and mixtures of at least two of said gaseous fuels.

12. A combustion method by means of a burner according to claim 1,
whereby the gaseous combustion oxidant is supplied to the first fluid inlet so that the gaseous combustion oxidant flows from the first fluid inlet into the first inlet compartment and from the first inlet compartment via the first through passages into the first outlet compartment and from the first outlet compartment via the first outlet passages and the first ejection openings into the downstream area,
whereby the gaseous fuel is supplied to the second fluid inlet so that the gaseous fuel flows from the second fluid inlet into the second inlet compartment and from the second inlet compartment via the second through passages into the second outlet compartment and from the second outlet compartment via the second outlet passages and the second ejection openings into the downstream area, and
whereby the gaseous fuel is combusted with the gaseous combustion oxidant in downstream area in the form of a flame curtain extending in the longitudinal direction.

13. The combustion method according to claim 12, whereby gaseous fuel is ejected into the downstream area with a gaseous fuel injection velocity and the gaseous combustion oxidant is ejected into the downstream area with an oxidant injection velocity and whereby the ratio between the gaseous fuel injection velocity and the oxidant injection velocity is in the range of 0.5 to 1.50.

* * * * *